Jan. 19, 1971    M. W. PANEK    3,556,808
MEAT INJECTION METHOD
Filed April 9, 1969    2 Sheets-Sheet 1
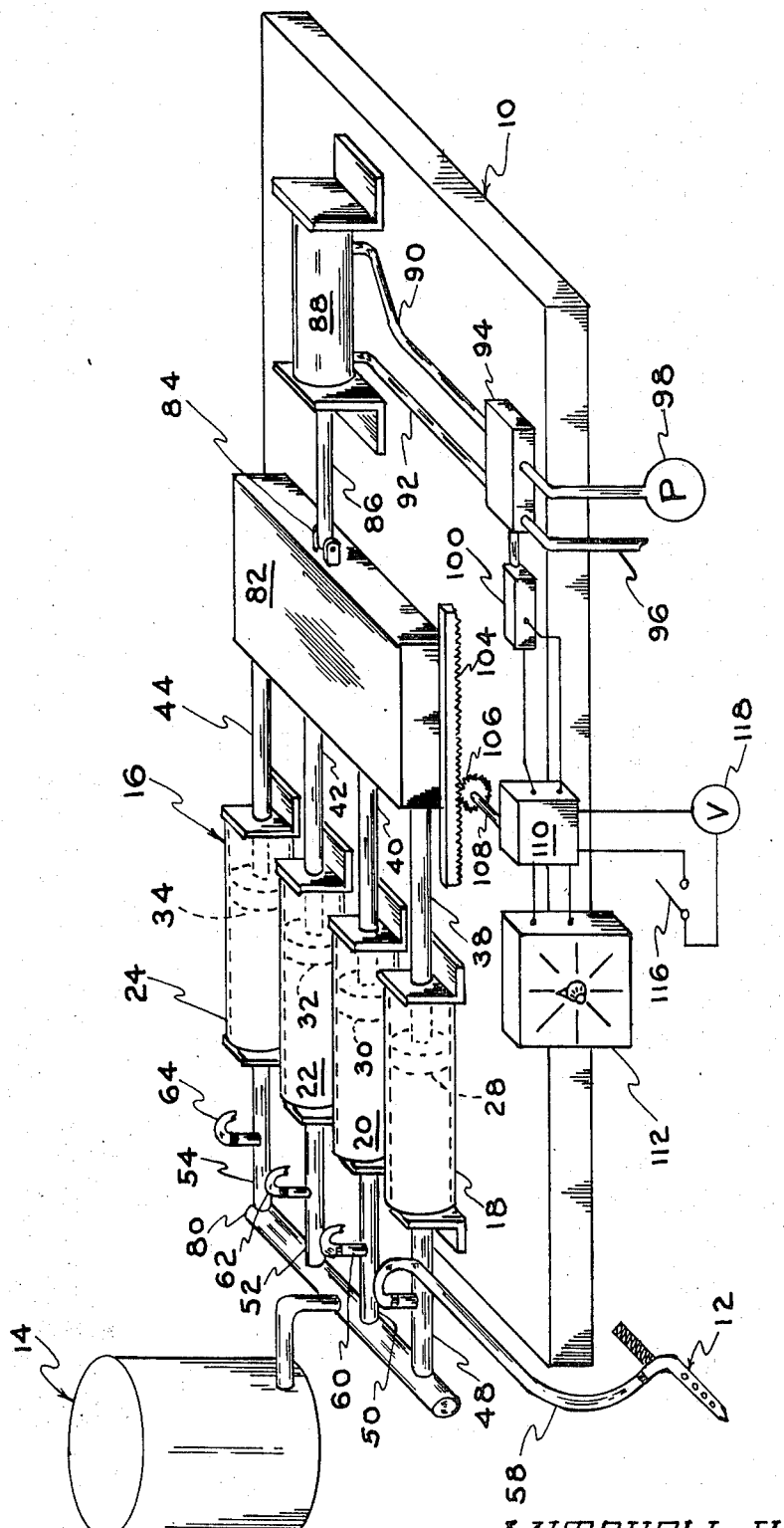
Fig-I
INVENTOR.
MITCHELL W. PANEK
BY
McCabe
ATTORNEY

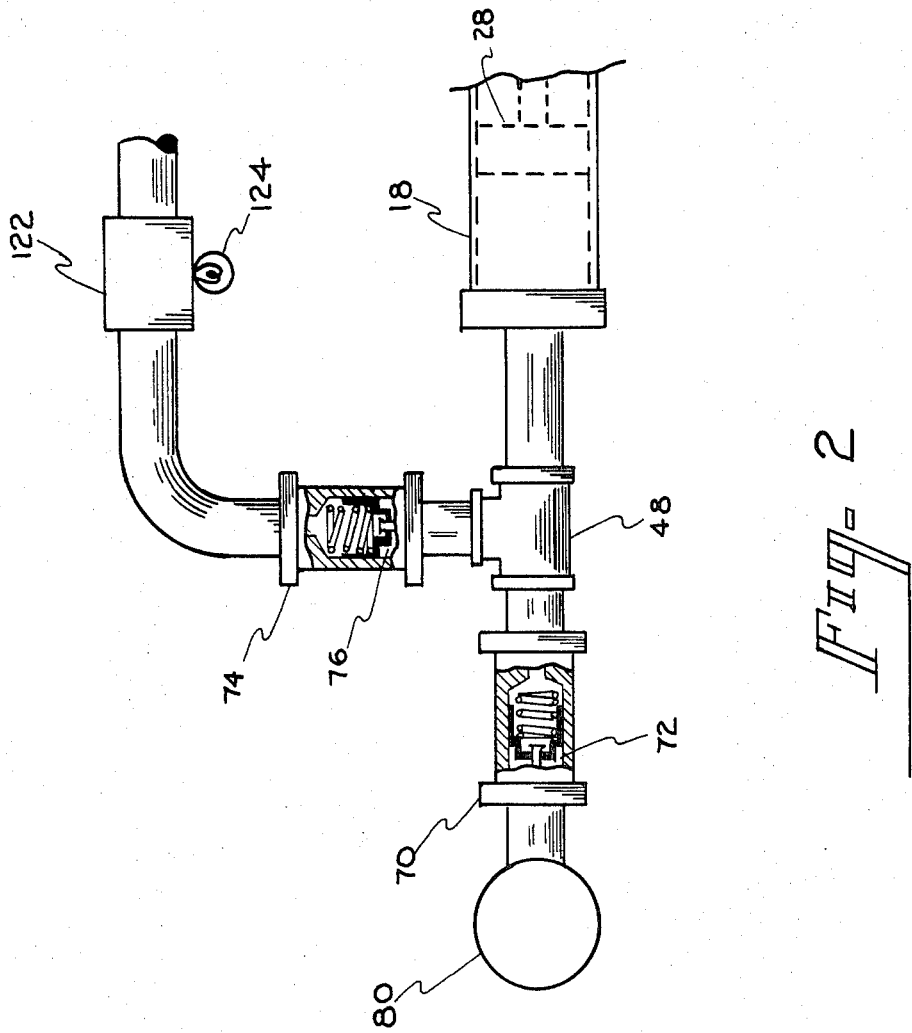

United States Patent Office 3,556,808
Patented Jan. 19, 1971

3,556,808
MEAT INJECTION METHOD
Mitchell W. Panek, Chicago, Ill., assignor to Swift & Company, Chicago, Ill., a corporation of Delaware
Filed Apr. 9, 1969, Ser. No. 814,781
Int. Cl. *A22c 18/00, 21/00*
U.S. Cl. 99—107      5 Claims

ABSTRACT OF THE DISCLOSURE

Liquid material for injection at a plurality of sites in a food item is dispensed simultaneously in separate amounts, each amount being a desired proportion of a total quantity of liquid, and delivered for injection at the sites for equal intervals of time.

---

This invention relates to the food processing art and more particularly is an improved method and apparatus for providing measured quantities of liquid materials for injection at a plurality of sites in a food item, especially a meat item.

There is an increasing current interest in the food art in processes and apparatus for introducing liquid additives into food materials. Meat items in particular have been found to be benefited by the introduction of various liquid agents. In recent years there has been much attention directed to the injection of flavoring and/or tendering agents into meats; and also the injection of liquid fats to either add to or replace fats naturally occurring in meat for nutritional balance and/or improved cooking characteristics.

Distribution of such liquid materials throughout meat items has caused problems. Usually it is desired to achieve a relatively uniform distribution based upon weight of meat. This has usually required the application of a plurality of instruments for introducing the material into the meat at several different sites, or the repeated use of a single or few such instruments to cover a multiplicity of such sites. Several factors, have, however, hindered uniform distribution. Sometimes the instruments become clogged, or the meat in one area is more difficult to penetrate with liquid than other areas. Often the amount of material injected at any given site has depended upon the determination of time interval by an operator. Also, with some items such as poultry, it has been found that separate sites of injection may require differing amounts of liquid material, i.e., the requirement for legs, wings and breast areas differ considerably in the amount of liquid material that can be absorbed. The latter is particularly significant when it is realized that government regulations may limit the amount of material that can be injected to a percentage of the weight of the item and separable portions thereof.

Accordingly, it is a principal object of the present invention to provide an improved method and apparatus for delivering measured proportions of liquid to be injected at separate sections of a food item.

It is another object of the invention to provide an improved method and apparatus for closely and automatically regulating the total amounts of liquid delivered for injection at a plurality of sites in a single item.

It is a further object of the present invention to provide an improved method and apparatus to accurately regulate the actual amount of liquid delivered for injection to a specific site of an item.

It is still another object of the present invention to provide an improved method and apparatus to obviate the possible diminution of liquid delivered to one of several sites in an item due to blockage or partial blockage of the supply to that site.

Still another object of the present invention is to provide an improved method and apparatus that will avoid the diversion of an oversupply of liquid to be delivered for injection at one or more sites of an item due to a blockage or partial blockage of the supply to another site.

The present method contemplates the separate metering and delivering of a liquid agent simultaneously to a plurality of injecting instruments located at separate sites on a food item such as meat—especially a poultry carcass. Preferably the separate amounts delivered to the various sites are regulated by rate of flow to each site and the interval of delivery and injection is simultaneous and equal for each site.

An apparatus to perform this method basically comprises a plurality of liquid metering means having a common powered means for simultaneously expelling liquid therefrom. Preferably, the liquid metering means may vary with respect to one another, in obtainable rate of flow. Also each metering means is connected to a separate delivery means directed to a selected site of the item; and the respective metering means is preferably adapted to dispense an appropriate proportion of the total liquid required at the particular site to which it is directed.

Further objects and advantages of the invention will become apparent upon reading the following detailed description in conjunction with the drawings wherein:

FIG. 1 is an overall perspective view of a preferred embodiment of the apparatus of the present invention; and FIG. 2 is a detailed view of a portion of the apparatus of FIG. 1.

In a preferred practice of the present method, a poultry carcass is weighed and a total quantity of liquid to be injected therein is determined. It is necessary to distribute the total quantity of liquid to at least two, and usually more, separate injection sites as, for example, both sides of the breast. Normally a plurality of injection sites in each side of the breast is desirable. Also it may be desirable to inject liquid separately into each thigh and/or leg portion of the carcass; and possibly also into the fleshy portion of each wing. Obviously, each of the latter portions includes progressively smaller portions of the total flesh available from a poultry carcass and hence the amount or proportion of total quantity of liquid to be injected at each area is also progressively smaller. The present method contemplates separate injection instruments being applied to each area and separately measuring and dispensing an appropriate proportion of the total selected quantity for each respective area or site.

For economical and efficient processing it is preferred that the injection at all sites be accomplished simultaneously. A convenient way to accomplish this is to regulate the rate of flow of liquid to each site and thus it is possible to inject simultaneously and over a single interval of time different proportions or incremental amounts of the total quantity of liquid determined initially as an overall percentage of the total weight of the bird.

From the following description of a preferred apparatus for performing this method it will be found that a desirable element for so metering and dispensing a liquid is a cylinder and piston combination. Hence, the amount of fluid expelled therefrom will be determined by the diameter of the cylinder and the length of stroke of the piston. Accordingly, where a number of such metering devices are ganged together and are structurally confined to a common length and rate of stroke it follows that the rate of liquid delivery will be directly related to the diameter of each cylinder. Therefore the cylinder size will determine the proportion of the total quantity of liquid that is to be metered and delivered to a specific site; and the length of stroke of the piston will determine the actual amount, and total quantity, of liquid delivered from each, and all, of such metering cylinders.

The foregoing method has proved particularly efficient when utilized to introduce a liquid fat for injection into turkeys. Such an application is disclosed in the copending patent application S.N. 717,803 filed Apr. 1, 1968 by E. J. Strandine and C. W. Peckenpaugh now Pat. No. 3,511,164 issued May 12, 1970.

A preferred embodiment of the apparatus for carrying out the foregoing method is shown in FIGS. 1 through 3. wherein the injecting instruments shown generally at 12 may be multiple orifice needle-type instruments as shown in the aforementioned application S.N. 717,803. The present apparatus also comprises a reservoir tank generally 14, connected to deliver liquid by gravity to a metering and dispensing means generally 16, which is also connected to supply the injecting instruments generally 12. As shown in the drawings, the metering and dispensing means generally 16 and the reservoir generally 14 are mounted upon a suitable base generally 10 such as a table or shelf or the like.

The metering and dispensing means generally 16 comprises four hollow cylinders 18, 20, 22 and 24. A greater or lesser number of such cylinders may be utilized. These cylinders are of equal length but may vary in diameter in accordance with the proportions of total liquid desired to be delivered at any specific injecting instrument 12 applied to a specific chosen site. In the preferred apparatus, each cylinder is demountably supported on brackets fixed to the base 10 and hence may be interchanged with other size cylinder shells with relative ease.

Each cylinder contains a close fitting internal piston 28, 30, 32, and 34. Each piston is demountably attached, as by threads or the like, to respective piston rods 38, 40, 42 and 44, which extend from the rear of each respective cylinder 18, 20, 22 and 24.

At the opposite end of each cylinder is located a single port to which is attached respective T pipes 48, 50, 52 and 54. A plurality of delivery lines 58, 60, 62 and 64 are connected each to the respective legs of the T pipes 48, 50, 52 and 54. The construction of each T pipe is similar and the details of each may be seen in FIG. 2 where T pipe 48 is illustrated in detail. The horizontal cross piece of the T 48 contains an expanded section beyond the vertical leg wherein is contained a spring loaded check valve 70 that will seat against shoulders 72 when liquid is being expelled from the cylinder 18. Similarly, the vertical leg of the T 48 includes an expanded section wherein a spring loaded check valve 74 will be lifted from shoulder 76 when liquid is being expelled from cylinder 18. The horizontal cross piece of each T 48, 50, 52 and 54 is connected to a common manifold 80 that is fed by gravity from the reservoir generally 14. As the piston 28 is withdrawn to the right in cylinder 18 fluid will be drawn from manifold 80 through the cross piece of the T 48 and the check valve 70 will be forced from the shoulder 72 permitting the fluid to flow into the cylinder 18. At the same time the check valve 74 will be seated on shoulder 76 hence preventing reverse flow of fluid that may remain in the delivery line 58.

Each of the respective piston rods 38, 40, 42 and 44 is fastened to a common yoke 82 that is slidable in ways (not shown) on the base 10. A clevis 84 extending from the rear edge of yoke 82 receives the free end of a piston rod 86 extending from a power cylinder 88. Preferably the power cylinder 88 is pneumatic for rapid and low-pressure operation. However, a hydraulic cylinder would also be suitable, and indeed other reciprocable power means could be utilized to operate the yoke 82 and connected pistons 28, 30, 32 and 34.

In the preferred embodiment illustrated, which utilizes a pneumatic power cylinder 88, there is an air line 90 connected to the rear end of the cylinder 88 and a similar air line 92 connected to the forward end. Both air lines 90 and 92 are in turn connected to a 4-way control valve 94 which also contains an exhaust port 96 to atmosphere and a pressure port connected to a source 98 of air under pressure. The 4-way control valve 94 is of a commonly available type having a reciprocable core to alternately connect the rear and forward ends of the power cylinder to the air pressure source 98 and the exhaust port 96.

The control valve 94 is actuated by a solenoid 100 that is spring biased, when de-energized, to shift the core of valve 94 to direct pressurized air through air line 92 to the forward end of power cylinder 88. Thus, when solenoid 100 is not energized, the piston (not shown) within cylinder 88 will be withdrawn to the right (in the drawings) thereby similarly withdrawing the pistons 28, 30, 32, and 34 of the respective cylinders 18, 20, 22 and 24 so as to draw liquid therein from the manifold 80 and reservoir generally 14.

The solenoid 100 is, in turn, energized by the closing of a switch 116 by an operator. Closing of the switch 116 completes a circuit from a source of electric power 118 and the solenoid will remain energized until the circuit from the power source is broken. Preferably means is provided to automatically break this circuit upon the desired total quantity of liquid being dispensed from the ganged cylinders 18–24. However, the function could also be performed manually by the operator upon noting either an appropriate forward movement of the yoke 82 or a desired increase in weight of the item being treated if the latter is retained upon a scale during treatment.

However, the preferred apparatus shown in FIG. 1 will automatically terminate the dispensing of liquid upon the yoke 82 moving forward a distance sufficient to dispense the total quantity of liquid desired. To accomplish this a rack segment 104 is fastened to one side of the yoke 82. A mating gear or pinion 106 is mounted on a shaft 108 which is journaled in bearings (not shown) to maintain the pinion 106 in contact with the rack 104. In turn the opposite end of shaft 108 is connected to an adjustable resistance of a potentiometer 110. This potentiometer 110 is denominated a "seeking" potentiometer in that it is moved automatically in accordance with the motion of yoke 82 and seeks an appropriate stopping point. The seeking potentiometer 110 is electrically connected to a selector potentiometer 112 which is calibrated for operation by an attendant. The attendant upon noting the total weight of the item to be processed (such as a poultry carcass) merely presets the resistance of the potentiometer 112 and when the injectng instruments generally 12 have been appropriately placed on the item the attendant then closes the switch 116. As previously described this initiates actuation of the dispensing apparatus and the rack 104 will move with yoke 82 whereby changing the resistance of the potentiometer 110 until an electrical balance is obtained with potentiometer 112. At that time an internal switch (not shown) in potentiometer 110 will open to break the electrical connection to solenoid 100 and the dispensing of liquid will immediately cease as the power cylinder 88 will be reversed to withdraw the yoke 82 and associated components. Reverse movement of the rack 104 will reset the "seeking" potentiometer 110 and at the same time reclose the internal switch therein.

An additional feature that may be incorporated in the apparatus is also shown in FIG. 2. It is possible that a blockage may occur at any one or more of the injecting instruments generally 12. If this should occur, the respective metering cylinder as for example cylinder 18 will not expel fluid with the result that pressure therein will immediately increase and either (1) a blowout will occur (normally in the associated delivery line 58) or (2) the internal force on piston 28 will be sufficient to overcome the power exerted from power cylinder 88 and the entire apparatus will be jammed. In either event the item being treated will not receive an appropriate quantity of liquid and it is thus desirable that such a condition be immediately made known to the attendant. Accordingly each delivery line 58 may be provided with a pressure sensitive switch 122 and a signal lamp 124 (both being connected to a source of electrical power not shown). Thus upon the fluid pressure in a delivery line, as for example line 58, increasing to an above-normal condition the presssure sensitive switch 122 will close, completing a circuit to the signal lamp 124 which is thereby illuminated to signal the attendant to manually stop the apparatus by opening switch 116. Obviously a suitable control circuit could be substituted to be automatically actuated by any pressure sensitive switch 122 and automatically open the control switch 116.

Obviously many modifications and variations of the invention as hereinbefore set forth may be made without departing from the spirit and scope thereof, and, therefore, only such limitations should be imposed as are indicated in the appended claims.

I claim:
1. An improved method for providing a liquid material to be injected at a plurality of sites in a food item, said method comprising: applying a plurality of liquid injecting instruments to separate sites on said item; delivering separately measured amounts of liquid for injection to each of said instruments; and injecting said amounts of liquid at each of said sites simultaneously into said item for equal intervals of time at individual rates whereby measured amounts of liquid are supplied to each site in proportion to each individual rate.

2. The method of claim 1 wherein the total quantity of such measured amounts of liquids is a function of the weight of said item.

3. The method of claim 1 wherein the length of the interval of time of injection is regulated to obtain a desired total quantity of liquid injected.

4. The method of claim 1 wherein the amounts of liquid are delivered by being expelled from cylinders by pistons therein, and the interval of time for injecting said amounts is regulated by controlling the stroke of said pistons.

5. The method of claim 1 wherein a liquid fat is injected into a flesh of poultry carcass at a plurality of sites.

References Cited
UNITED STATES PATENTS

| | | | |
|---|---|---|---|
| 3,232,209 | 2/1966 | Earl et al. | 99—257 |
| 3,366,491 | 1/1968 | Schwall et al. | 99—107 |
| 3,511,164 | 5/1970 | Strandine et al. | 99—257 |

HYMAN LORD, Primary Examiner